United States Patent [19]

Yanadori et al.

[11] Patent Number: 4,612,974
[45] Date of Patent: Sep. 23, 1986

[54] HEAT STORAGE DEVICE

[75] Inventors: Michio Yanadori, Ryuugasaki; Tomohiro Kawano, Minori; Seigo Miyamoto, Takahagi; Yasuaki Nara, Tsuchiura; Masahiro Oguri, Chiba, all of Japan

[73] Assignee: Hitachi, Ltd., Tokyo, Japan

[21] Appl. No.: 704,413

[22] Filed: Feb. 22, 1985

[30] Foreign Application Priority Data

Feb. 22, 1984 [JP] Japan .................................. 59-30239

[51] Int. Cl.⁴ ............................................. F28D 17/00
[52] U.S. Cl. ....................................... 165/10; 126/400
[58] Field of Search .................. 165/10; 126/400, 430, 126/436

[56] References Cited

FOREIGN PATENT DOCUMENTS

| 3018799 | 11/1981 | Fed. Rep. of Germany | 165/10 |
| 2407434 | 6/1979 | France | 165/10 |
| 55351 | 4/1982 | Japan | 126/430 |
| 24188 | 2/1984 | Japan | 165/10 |

Primary Examiner—Albert W. Davis, Jr.
Attorney, Agent, or Firm—Antonelli, Terry & Wands

[57] ABSTRACT

A heat storage device is disclosed in which grooves for supports supporting heat storage vessels, each vessel storing therein a heat storage material, are defined on the lower surface of each of the vessels so that the supports do not project from the bottom surface of each vessel.

3 Claims, 18 Drawing Figures

HEAT STORAGE DEVICE

BACKGROUND OF THE INVENTION

1. Field of the Invention

This invention relates to the construction of a heat storage device using a combination of a large number of heat storage vessels, each storing therein a heat storage material.

2. Description of the Prior Art

As disclosed, for example, in European Patent Application No. 0041386, a conventional heat storage device stores a sensible heat type heat storage material such as water or a latent heat type heat storage material such as polyethylene glycol or calcium chloride hexahydrate in each heat storage vessel made of plastic or metal. Usually, an aggregate of a large number of such heat storage vessels placed on supports is used as the heat storage device. A fluid such as air is caused to flow around each vessel in such a fashion that heat is applied from the fluid to the heat storage material through the outer surface of the vessel, or heat is taken in by the fluid from the heat storage material. Therefore, the heat storage vessels are arranged in such a manner as to define gaps between them through which the fluid flows. In order to make the heat storage device as a whole compact and to enlarge the heat storage capacity, the size of this gap is preferably as small as possible to such an extent that the fluid can flow therethrough.

In a conventional heat storage device, however, the gap cannot be reduced because the interference of the supports for the heat storage vessels. Moreover, the supports impede the flow of the fluid, increase draft resistance and heat resistance and partly inhibit the reduction of size of the heat storage device.

SUMMARY OF THE INVENTION

In order to solve the problems of the conventional heat storage device described above, the present invention is directed to reduce the size and increase the capacity of a heat storage device by reducing the gaps between heat storage vessels without increasing draft resistance and heat resistance.

A characterizing feature of one embodiment of the present invention resides in the following construction: Grooves for supports are disposed on the wall of each heat storage vessel so that the supports do not excessively protrude from the outer surface of the heat storage vessels, thereby narrowing the gaps between the heat storage vessels. Further, each vessel is given a curvature to disturb the flow of an external fluid, resulting in the reduction of its heat resistance. Thus, the construction of the heat storage device, as a whole, can be reduced in its size, and will exhibit an increased capacity.

It will be appreciated that this construction disturbs the flow of an external fluid, decreases heat resistance, reduces the size of the heat storage device as a whole, but advantageously increases the capacity of the device.

Another embodiment of the invention is characterized in that separate supports are eliminated and the heat storage vessels are each provided with spacer or support means in the form of projection or protrusion which support the vessel in a spaced-apart arrangement.

DESCRIPTION OF THE PREFERRED EMBODIMENTS

Figure 1:
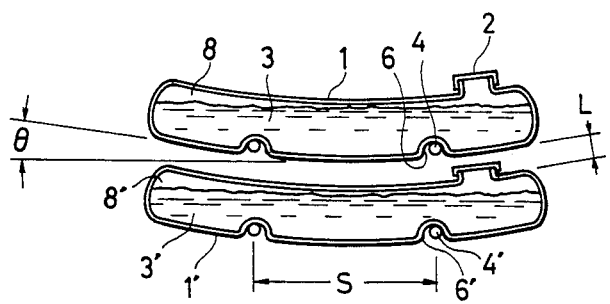
FIG. 1 is a longitudinal sectional view of a heat storage device in accordance with one embodiment of the present invention.
Figure 2:
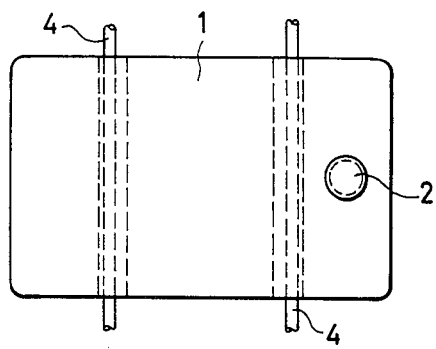
FIG. 2 is a plan or top view of FIG. 1.

FIGS. 1 and 2 show a heat storage vessel in accordance with one embodiment of the present invention. A plurality of grooves 6 are defined in parallel with each other on the wall of the heat storage vessel 1 made of metal or plastic to accommodate therein supports 4. According to this arrangement, the supports 4 do not project from the outer surface of the heat storage vessel 1, and the gap L between this vessel 1 and another 1' adjacent to the former in the vertical direction can be consequently reduced to that extent. Therefore, the size of a heat storage device consisting of a large number of these heat storage vessels (1,1',etc.) can be reduced. Since these grooves 6 are disposed in a certain spaced arrangement, the heat storage vessel 1 bears the weight of a heat storage material 3 and, hence, is apt to bend. FIG. 1 shows the case where the gap S between the supports 4 is great, and the upper surface of the heat storage vessel 1 is curved in a recessed form. It is possible to reduce this gap S between the supports 4 and to let the upper surface of the vessel 1 curve in a convex manner.

Figure 3:
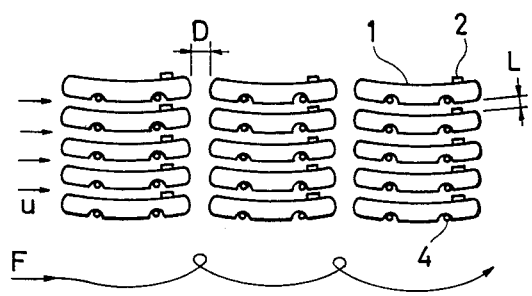
FIG. 3 is a schematic view of the heat storage device in accordance with one embodiment of the present invention.
Figure 4:
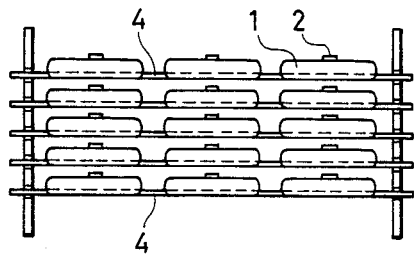
FIG. 4 is a side view of FIG. 3.

When a large number of heat storage vessels 1 are combined with one another and a fluid (such as air, water or the like) is caused to flow between the vessels 1, draft resistance due to the protrusion of the supports 4 can be reduced. Moreover, the flowing direction of the fluid is changed as represented by curved line F in FIG. 3. Therefore, turbulence occurs in the fluid, heat resistance from the heat storage vessel 1 to the fluid decreases while heat release from the fluid to the heat storage material or vice versa becomes easier, and reduction of the size of the heat storage device can be realized. When the heat storage vessel 1 is of a flat type, a practical size of the heat storage vessel, from the aspect of heat transfer rate and easy handling, is from 5 to 50 mm thick, from 100 to 700 mm long and from 50 to 500 mm deep. When the heat storage vessel 1 having such a practical size is curved, a suitable angle of inclination $\theta$, from the aspect of the rigidity of the heat storage vessel 1 and the draft resistance of the fluid, is in the range of 0.5 to 30 degrees.

The heat resistance of such a heat storage vessel 1 can be reduced by 5 to 30% when compared with the case where the vessel 1 is not curved at all ($\theta = 0°$). The gap D between one vessel and adjacent vessels in the horizontal direction may be zero, but is preferably from 3 to 50 mm in practice for those heat storage vessels which have a size falling within the range described above. This is because the fluid generates drastic expansion and contraction at the portions of the gaps D and the flow of the fluid becomes turbulent. Experiments revealed that the heat resistance was further reduced by 3 to 15%.

The vertical spacing or gap size L of the vertically adjacent vessels ranges from 1–20 mm and the preferred range of L is 3 to 10 mm.

Preferably, the heat storage material 3 is not completely packed into the heat storage vessel 1, but is packed in such a fashion as to leave spaces 8,8' in the vessel so that the heat storage vessel 1 can be bent more readily. The relative volume % of the space or spaces free of the material 3 is in a range of from 5–15%; with about 10% being the best.

Figure 5:
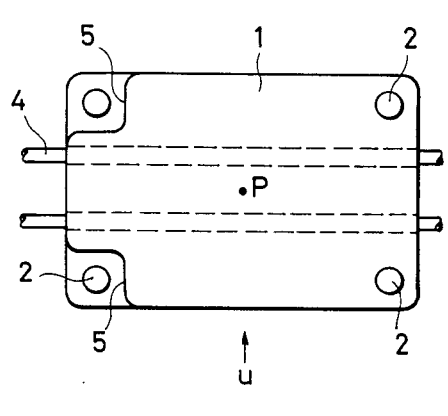
FIG. 5 is a plan or top view of the heat storage device in accordance with another embodiment of the invention.
Figure 6:
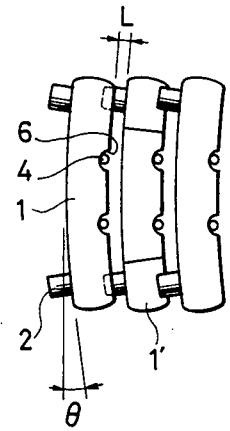
FIG. 6 is a side view of FIG. 5.

FIGS. 5 and 6 show another embodiment of the present invention, in which the grooves 6 and the supports 4 are disposed in parallel with the longitudinal direction of the heat storage vessel 1. The fluid flows vertically with respect to the longitudinal direction of the vessel 1. In this embodiment, recess 5 is disposed symmetrically with a lid 2 with respect to the center P of the heat storage vessel 1, and the lid 2 of the adjacent vessel 1 above the vessel 1 is positioned so as to face the recess and, thus, to reduce the gap L in the vertical direction.

Figure 7:
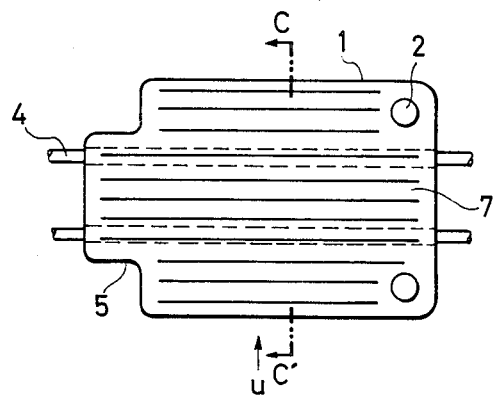
FIG. 7 is a plan or top view of the heat storage device in accordance with still another embodiment of the invention.
Figure 8:
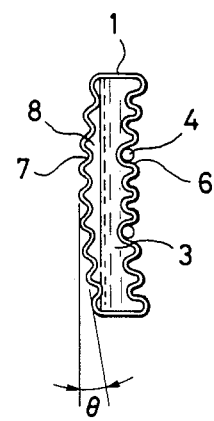
FIG. 8 is a sectional view taken along line C-C' of FIG. 7.

FIGS. 7 and 8 show still another embodiment of the invention, in which a large number of thin grooves 7 are defined on the wall of the heat storage vessel 1 in parallel with the grooves 6 for supports. According to this arrangement, the fluid flowing in heat exchange relationship along the outer surface of the heat storage vessel 1 is more able to cause turbulence, the heat resistance can further be reduced, and the heat storage vessel 1 is easier to curve. The present invention can also be applied to the case where the heat storage vessel 1 is not equipped with the lids 2.

Figure 9:
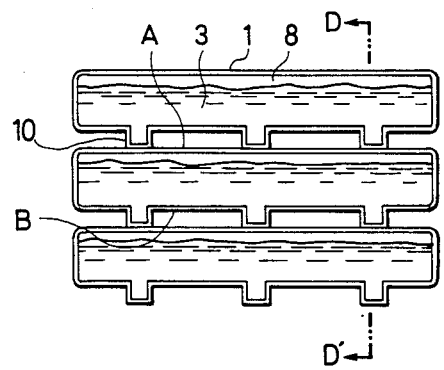
FIG. 9 is a longitudinal sectional view of the heat storage device in accordance with still another embodiment of the invention.
Figure 10:
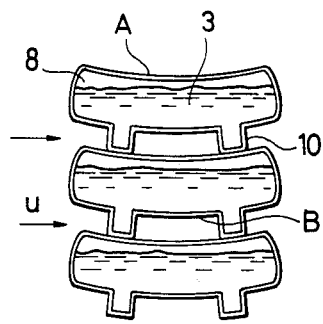
FIG. 10 is a sectional view taken along line D-D' of FIG. 9.
Figure 11:
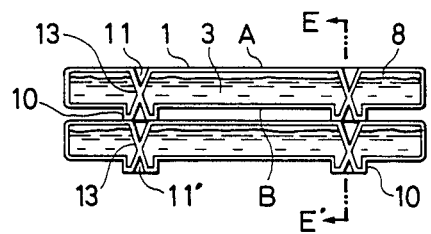
FIG. 11 is a longitudinal sectional view of the heat storage device in accordance with still another embodiment of the invention.

FIGS. 9 and 10 show still another embodiment of the present invention, in which support or spacer means in the form of protrusions 10 are disposed on the lower surface B of the heat storage vessel 1 in place of the grooves in the foregoing embodiments so as to curve the vessel and to reduce the heat resistance. The lower end of each protrusion 10 is put on the upper surface A of another heat storage vessel 1' existing below the vessel 1. Therefore, the supports 4 that are arranged in the grooves 6 in the other embodiments can be omitted. Since the protrusions 10 exist in this embodiment, draft resistance due to the protrusions develops. From this aspect, it is preferable to reduce the size as well as number of protrusions 10. However, the protrusions 10 provide the following effect. When the fluid (e.g., air) flowing along the outer surface of the heat storage vessel 1 is extremely humid, moisture is gathered effectively to a desired position to enhance the heat storage effect. When heat is stored, the outer surfaces A, B of the heat storage vessel 1 are wet with dew, but the dew attaching to the lower surface B of the heat storage vessel 1 moves along the protrusions 10 and flows to the upper surface A of another heat storage vessel 1' arranged below the vessel 1 (see FIG. 11). Heat transfer from the fluid to the heat storage material 3 during heat storage process is effected primarily through the lower surface B of the heat storage vessel 1 but not through the upper surface A. This is because the free spaces 8 exist inside the upper surface A and the heat storage material 3. Therefore, the dew deposited on the lower surface B of the heat storage vessel 1 should be removed as much as possible. This dew does not adversely affect the heat storage effect very much even when it is gathered on the upper surface A. To improve this effect, it is advisable to dispose a large number of thin grooves 7 such as shown in FIG. 8 or porous materials such as gauze or cloth at least on the lower surface B of a heat storage vessel.

FIGS. 11 through 14 show still another embodiment of the present invention, in which the heat storage vessel 1 is structurally reinforced. If the number of protrusions 10 is small, concentrated load will be applied to the heat storage vessel of a lower stage so that this vessel will be broken. To eliminate this problem, the protrusions 10 in this embodiment are elongated in the horizontal direction in such a manner as to enlarge the surface coming into contact with the heat storage vessel of the lower stage. This also improves the dew removing effect. Furthermore, connection components 13 are formed by disposing recesses 11, 11' on the upper surface A of the heat storage vessel 1 and at the lower ends of protrusions 10, so that the vessel 1 is more easily bent.

Figure 12:
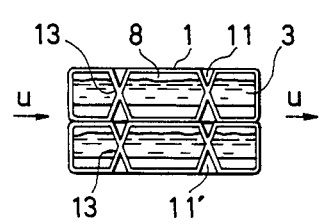
FIG. 12 is a sectional view taken along line E-E' of FIG. 11.
Figure 13:
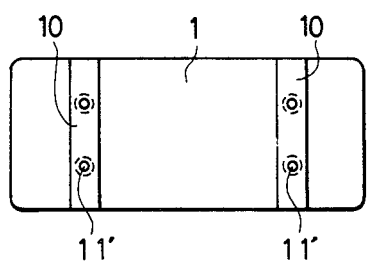
FIG. 13 is a plan or top view of FIG. 11.
Figure 14:
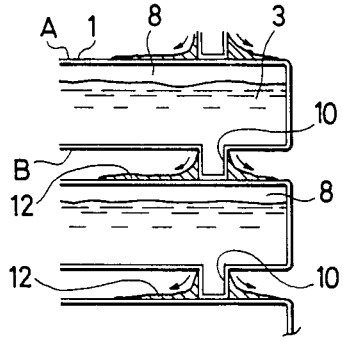
FIG. 14 is a schematic view useful for explaining the action of the present invention.

In this embodiment, the right and left ends of the heat storage vessel 1 shown in FIG. 12 may be supported by separater supports (not shown) in order to curve the vessel 1 as shown in FIG. 10. In this instance, the vessel is easier to curve if the number of recesses 11, 11' is increased. It is also possible to curve in advance the heat storage vessel 1 by adjusting the number or capacity of the recesses 11, 11'.

Figure 15:
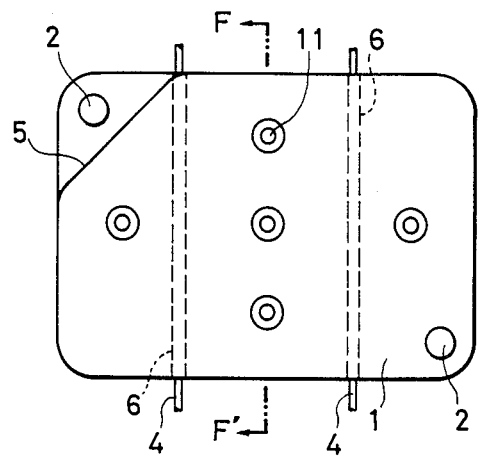
FIGS. 15 and 17 are plan or top views of other embodiments of the invention.
Figure 16:
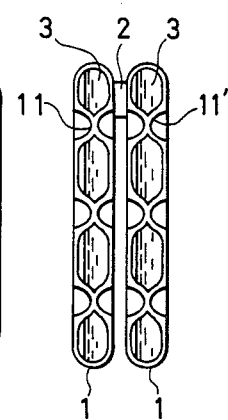
FIGS. 16 and 18 are sectional views taken along line F-F' and line G-G' of FIGS. 15 and 17, respectively.
Figure 17:
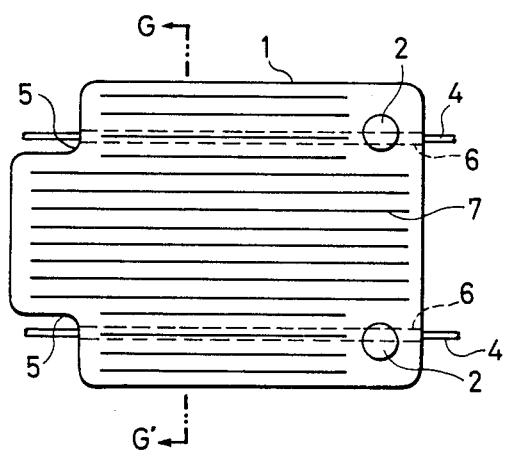
Figure 18:
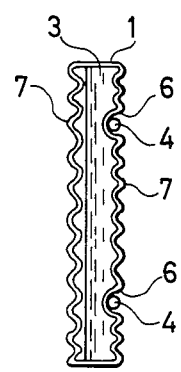

FIGS. 15 and 16 show still another embodiment of the invention, in which the angle of inclination $\theta$ is 0°. FIGS. 17 and 18 show still another embodiment of the invention, in which the angle of inclination is also 0°.

According to these embodiments as illustrated, the supports do not project much from the outer surface of the heat storage vessel; hence, the vertical gap between the heat storage vessels can be reduced.

It will be appreciated that the heat storage vessels in embodiments of the invention shown, for example, in FIG. 1, are formed of a flexible material, such as a thin metal or plastic sheet that will be deformed by the weight of the liquid heat storage material contained therein and by the location of the supports or spacer means.

What is claimed is:

1. A heat storage device comprising a plurality of heat storage vessels, each vessel storing a heat storage material therein, said vessels being arranged on supports in a rack form, and gaps for the flow of an external fluid being defined between said heat storage vessels adjacent to one another in the vertical direction, the lower surface of each of said heat storage vessels having grooves for said supports defined therein so that said supports do not project from the bottom surfaces of said heat storage vessels.

2. The heat storage device according to claim 1, wherein each of said heat storage vessels is curved in such a fashion as to cause turbulence of the flow of said external fluid.

3. The heat storage device according to claim 2, wherein each of said heat storage vessels is made of a flexible material and is deformed by the weight of liquid heat storage material contained therein and by the location of the grooves and associated supports on the lower surface thereof to provide a curved configuration which causes turbulence of the flow of said external fluid.

* * * * *